US012811433B2

(12) United States Patent
Taheri et al.

(10) Patent No.: US 12,811,433 B2
(45) Date of Patent: Nov. 24, 2026

(54) SYSTEMS AND METHODS FOR PROCESSING ENERGY LOAD DATA

(71) Applicant: Arbnco Ltd, Glasgow (GB)

(72) Inventors: Mahnameh Taheri, Glasgow (GB); Colin Parry, Glasgow (GB); Agnieszka Hermanowicz, Glasgow (GB); Alan Wegienka, Glasgow (GB); Loic Jacob, Glasgow (GB)

(73) Assignee: Arbnco Ltd, Glasgow (GB)

( * ) Notice: Subject to any disclaimer, the term of this patent is extended or adjusted under 35 U.S.C. 154(b) by 775 days.

(21) Appl. No.: 18/007,463

(22) PCT Filed: Jul. 28, 2021

(86) PCT No.: PCT/EP2021/071225
§ 371 (c)(1),
(2) Date: Jan. 30, 2023

(87) PCT Pub. No.: WO2022/023454
PCT Pub. Date: Feb. 3, 2022

(65) Prior Publication Data
US 2023/0275454 A1 Aug. 31, 2023

(30) Foreign Application Priority Data
Jul. 28, 2020 (GB) ..................................... 2011661

(51) Int. Cl.
*H02J 13/10* (2026.01)
*G06Q 50/06* (2024.01)
(Continued)

(52) U.S. Cl.
CPC .............. *H02J 13/10* (2026.01); *G06Q 50/06* (2013.01); *H02J 13/12* (2026.01); *H02J 13/14* (2026.01)

(58) Field of Classification Search
CPC ........... H02J 13/00001; H02J 13/00002; H02J 13/00004; H02J 3/00; H02J 2203/20;
(Continued)

(56) References Cited

U.S. PATENT DOCUMENTS

| | | | | |
|---|---|---|---|---|
| 9,026,261 B2 * | 5/2015 | Bukhin | ................. | G06F 1/3206 700/298 |
| 10,460,274 B2 * | 10/2019 | He | ....................... | G06Q 10/067 |

(Continued)

OTHER PUBLICATIONS

Rahman, Imran, Murat Kuzlu, and Saifur Rahman. "Power disaggregation of combined HVAC loads using supervised machine learning algorithms." Energy and Buildings 172 (2018): 57-66.
(Continued)

*Primary Examiner* — Ziaul Karim
(74) *Attorney, Agent, or Firm* — SLEMAN & LUND LLP

(57) ABSTRACT

A system and a method for the determination of energy consumption patterns for a building. The system may have an energy load data interface to receive energy load data originating from energy use sensors for the building; a data partition engine to apply a clustering model to the energy load data to determine one or more partitions within the energy load data; a temporal processing engine to segment and aggregate the energy load data over a set of predefined time periods, wherein the temporal processing engine is independently applied to the partitions determined by the data partition engine; a visualisation engine to generate visualisation data from the output of the temporal processing engine, the visualisation data comprising respective sets of data for the partitions determined by the data partition engine; and an output interface to output the visualisation data for display.

15 Claims, 10 Drawing Sheets

(51) Int. Cl.
*H02J 13/12* (2026.01)
*H02J 13/14* (2026.01)

(58) Field of Classification Search
CPC ......... G06Q 50/06; Y02E 60/00; Y04S 10/40; Y04S 40/20
See application file for complete search history.

(56) References Cited

U.S. PATENT DOCUMENTS

| | | | | |
|---|---|---|---|---|
| 2010/0324962 | A1* | 12/2010 | Nesler .................. | G01R 21/133 705/412 |
| 2012/0215369 | A1* | 8/2012 | Desai ...................... | G06Q 10/06 700/291 |
| 2016/0004290 | A1 | 1/2016 | Bukhin | |
| 2016/0018835 | A1* | 1/2016 | Gaasch ...................... | G05F 1/66 700/291 |
| 2018/0284758 | A1* | 10/2018 | Cella .................. | B62D 15/0215 |
| 2019/0041835 | A1* | 2/2019 | Cella .................. | G05B 19/4183 |
| 2019/0324444 | A1* | 10/2019 | Cella ........................ | A01B 3/02 |

OTHER PUBLICATIONS

Taheri, Mahnameh, et al. "Benchmarking Building Energy Consumption Using Efficiency Factors." Building Simulation Conference Proceedings, IBPSA. 2019.

* cited by examiner

SYSTEMS AND METHODS FOR PROCESSING ENERGY LOAD DATA

FIELD OF THE INVENTION

The present invention relates to systems and methods for processing energy load data. These systems and methods may be used to improve an energy efficiency of a building. They may be applied to large non-residential buildings. The present invention may be seen to reside in the field of energy systems engineering.

BACKGROUND OF THE INVENTION

Reducing energy use is a pressing problem for the modern world. Scientific studies show ongoing changes in the global climate. These include rising land and ocean temperatures. The studies indicate that human activity is the leading cause of these changes, in particular the emission of so-called "greenhouse" gases. There is evidence that buildings are a major source of greenhouse gas emissions. For example, buildings are respectively responsible for 46% and 40% of all $CO2$ emissions in the United Kingdom and United States. In order to address the problem of climate change, energy systems engineers are tasked with developing solutions to reduce building energy consumption and increase building energy efficiency. Solutions are desired that may be applied to both new and existing buildings.

One problem with reducing energy consumption is it is difficult to know where to begin. Through individual studies, energy systems engineers have identified large non-residential properties as being a relatively large consumer of energy. Commercial buildings, such as offices, public buildings, and retail outlets, use a lot of power but are difficult to analyse. For example, they often have multiple units with varying tenants and occupants, as well as industrial lighting, heating and air circulation systems. This may be contrasted with residential buildings, which have been more thoroughly investigated, have more predictable use patterns and offer greater scope for fine-grained measurement.

One area of energy systems engineering that is beginning to gain traction in both the home and the workplace is energy load measurement. For example, so-called "smart meters" have seen wide adoption in many buildings. Although specifics vary, energy load sensor systems are fairly easy to install, typically being passively attached to energy conduits that enter the building (such as electricity cables and gas pipelines). Their roll-out has also often been managed and subsidised by utility companies, as they require gross figures of energy use for accurate billing. However, one problem with this form of energy load measurement is that it tends to only provide a single gross level of energy consumption, such as a number of kilo Watt-hours (e.g., for gas and/or electricity) over time. While suitable for billing purposes, these measurements are difficult for energy systems engineers to use to reduce energy consumption. For example, it is often very difficult to identify causal factors of energy use from the raw data. This means that although energy load data for a building is becoming more available, it often goes unused. Despite many smart meters displaying the gross levels of energy consumption, this has not yet translated into widespread action to make buildings more environmentally friendly.

Given these problems, a number of possible solutions have been suggested.

U.S. Pat. No. 10,460,274B2 describes systems and methods for performing energy disaggregation of a whole-house energy usage waveform. In this publication, the disaggregation of a residential building is based at least in part on the whole-house energy usage profile, training data, and predetermined generic models. An example system includes: a module for pairing impulses identified in the whole-house energy usage waveform to indicate an appliance cycle, pairing impulses with at least one up transition with at least one down transition; a module for bundling impulses that are representative of an appliance cycle; a classification module, which upon determination of a type of appliance associated with bundles, is configured to classify the bundles of transitions in accordance with bundles exhibited by similar appliances with similar characteristics; and utilizing such pairing module and module for bundling to perform energy disaggregation. Graphical user interfaces are also presented for the presentation of such data and the receipt of user-supplied validation and information.

While U.S. Pat. No. 10,460,274B2 offers certain solutions for small scale residential energy load analysis, these solutions are less applicable to larger commercial buildings. For example, within a small home or residence, there are a small number of appliances, with often one of each appliance type (e.g., one fridge, cooker, pool pump etc.). As many domestic appliances of different types have distinct waveform patterns, this simplifies disaggregation and makes it more straightforward to identify use patterns from the energy load data.

Imran Rahman, Murat Kuzlu, and Saifur Rahman, in their paper "Power disaggregation of combined HVAC loads using supervised machine learning algorithms", published in Energy and Buildings, Volume 172, 2018, Pages 57-66, ISSN 0378-7788, describe power disaggregation algorithms that are used to decompose building level power consumption data into individual equipment level power information. In order to ensure energy efficient operation of complex systems, such as commercial buildings, they indicate that a continuous and detailed energy monitoring system is essential. In the paper, the authors present a novel power disaggregation technique, in which a single set of aggregated power usage data of multiple heating, ventilation and air-conditioning (HVAC) systems from a single power meter is disaggregated to identify the operations of individual HVAC units. Parameters, including the combined real and reactive power of compressors and air handlers, are used in addition to the phase currents of both, as well as the true index values representing the combination of active compressors at any given time.

While the approach described in the above paper provides a method to identify the operations of individual HVAC units, it still requires a continuous and detailed energy monitoring system, and requires specific parameters of the HVAC systems, meaning that the approach is difficult to scale to a large variety of commercial buildings.

It is thus desired to provide methods and systems for the processing of energy load data that helps an aim of reducing energy consumption of large buildings and building complexes.

SUMMARY OF THE INVENTION

Aspects of the present invention are set out in the appended independent claims. Variations of these aspects are set out in the dependent claims.

Further features and advantages of the invention will become apparent from the following description, which is made with reference to the accompanying drawings.

DETAILED DESCRIPTION OF THE INVENTION

Figure 1:
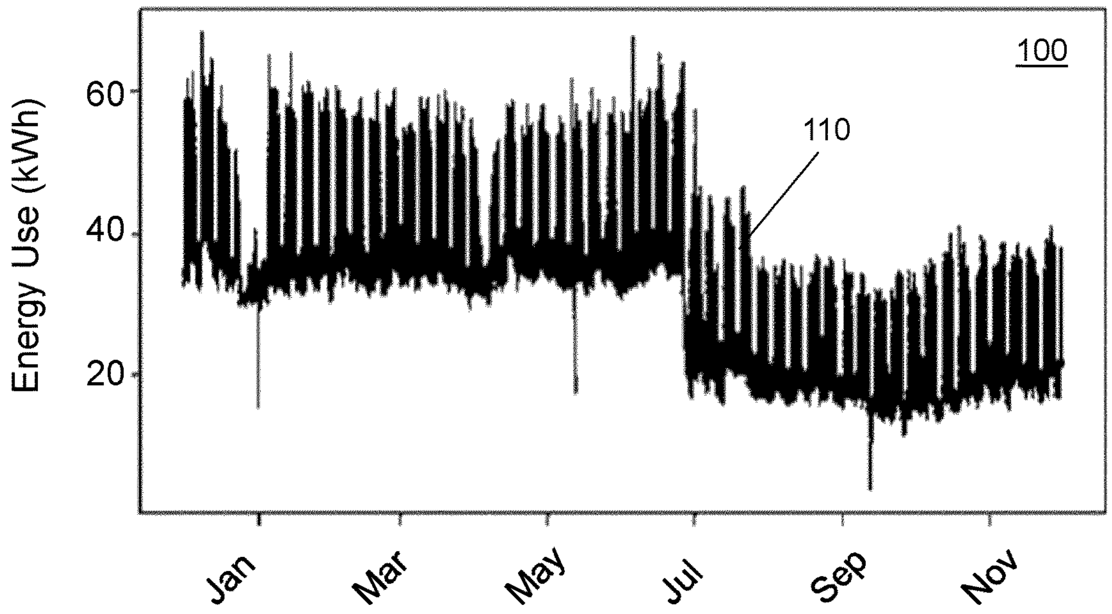
FIG. 1 is a chart showing an example set of energy load data.

Certain examples described herein relate to systems and methods for determining energy consumption patterns from energy load data. In these examples, "energy load data" comprises data that indicates an amount of energy that is used by a building, i.e. the energy "load" on the building. Typically, energy load data is provided as time-series data whereby one or more energy consumption values at different points in time are measured. For example, electrical power or gas consumption may be recorded at predefined time intervals (e.g., every minute, every defined fraction of an hour or hourly) by sensor devices that are mounted within or upon energy conduits that feed the building, such as gas pipelines or electrical power lines. Time-series data may be represented as an n-dimensional array of data, where n is equal to the number of properties being measured (e.g., 1 for electrical power load or 2 for electrical power load and fuel load). In examples, the energy load data is processed so as to transform the original measurements and provide information that may be used to reduce energy consumption and/or more efficiently control energy use in the building. By transforming the measurements in this way, it may be possible to identify up to double-digit percentage savings in energy use and/or double-digit percentage reductions in wasted energy. This in turn allows for a substantial source of global carbon emissions to be reduced.

In particular, energy load data is typically difficult to process, as it is a gross measure of energy consumption. Within raw energy load data many different factors are integrated in a non-linear manner. For larger non-residual buildings, patterns in the measured data often change over time in ways that make analysis difficult. For example, outdoor weather conditions, user behaviour, and/or changes in use patterns may introduce a wide range of variations in the energy load data. This makes it difficult to compare different time periods within the data and/or compute aggregate measures. Due to these factors, when faced with an increase in raw energy load data values, it may be difficult to know whether this reflects a substantive change in use that warrants further investigation (e.g., as an area where energy consumption may be reduced) or whether it reflects seasonal patterns of use, where the use is already efficient. While the present examples may be applied in both residential and non-residential buildings (e.g., homes and workplaces), they are particularly useful in the second case. This is because non-residential buildings such as shops, offices, factories and public buildings typically consist of units that have a much larger floorspace area than residential buildings, have a greater variety of electrical equipment (including industrial equipment) and are occupied at different times by a larger number of people. This means that energy load data analysis methods that work well within a residential context can fail to provide a benefit for the analysis of energy load data from commercial or non-residential buildings.

FIG. 1 shows an example of energy load data 100 for a year for an office. The energy load data comprises a series of energy use values 110 (plotted as y-axis values) over time (where time is plotted along the x-axis). For example, a reading may be taken from an electricity and/or gas meter every hour, with energy use here being measured in kilo Watt-hours (kWh). As can be seen from the values 110, there is a shift (i.e. a sudden change) in energy consumption in July. From investigations undertaken by the inventors, it has been ascertained that shifts similar to these are often found in energy load data for non-residential buildings. Often the shifts are a result of a number of complex and interdependent causal factors and do not align with a common sense understanding of seasonal patterns of heating and cooling. It has been found that for a large number of buildings these shifts are difficult to predict based on properties of the building, such as its usage type and/or location. When comparative data processing approaches are applied to the data shown in FIG. 1, they often produce inaccurate results. For example, computation of a daily average for display or comparison (e.g., to indicate consumption above this average) across the extent of the values shown in FIG. 1 would produce an output that is inaccurate for both periods.

In the examples described herein, at least two processing approaches are applied to make the raw energy load data interpretable for efficient future control and reduction of energy consumption. In a first approach, the energy load data is processed to identify partitions or clusters in the data. For example, unsupervised machine learning methods may be applied. In a second approach, temporal processing of the energy load data is performed separately on the identified partitions within the energy load data. The output of the temporal processing is then provided as sets of outputs that may be visualised or otherwise acted upon separately. In one case, the examples described herein may be incorporated into a local and/or remote "smart meter" for a building. This modified smart meter is then able to display accurate energy consumption patterns for use in reducing energy consumption. The present examples may be thought of as applying an advance in the field of (energy) load shape analysis to provide useful metrics that relate to energy consumption over time in order to improve the energy use of buildings.

Figure 2:
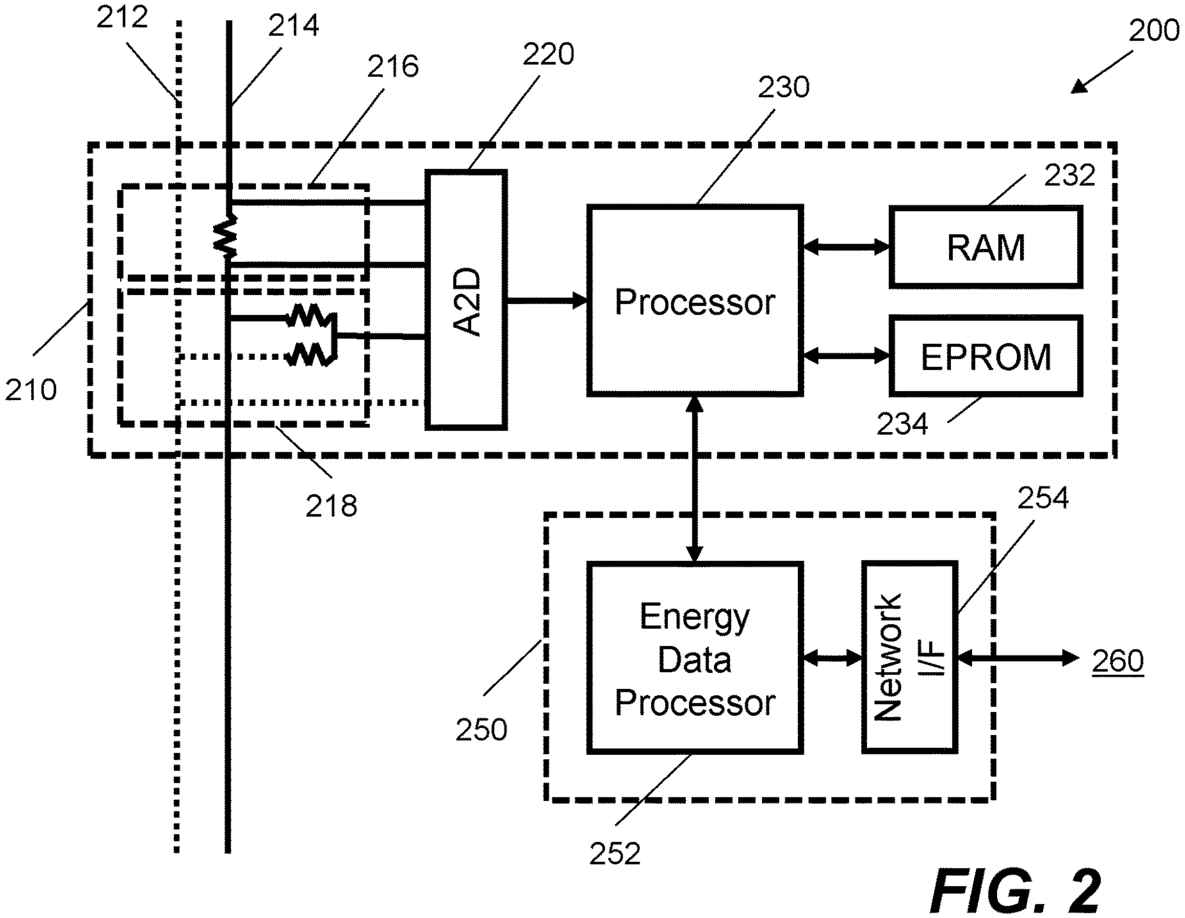
FIG. 2 is a schematic diagram showing an example smart meter and energy data processor.
Figure 3:
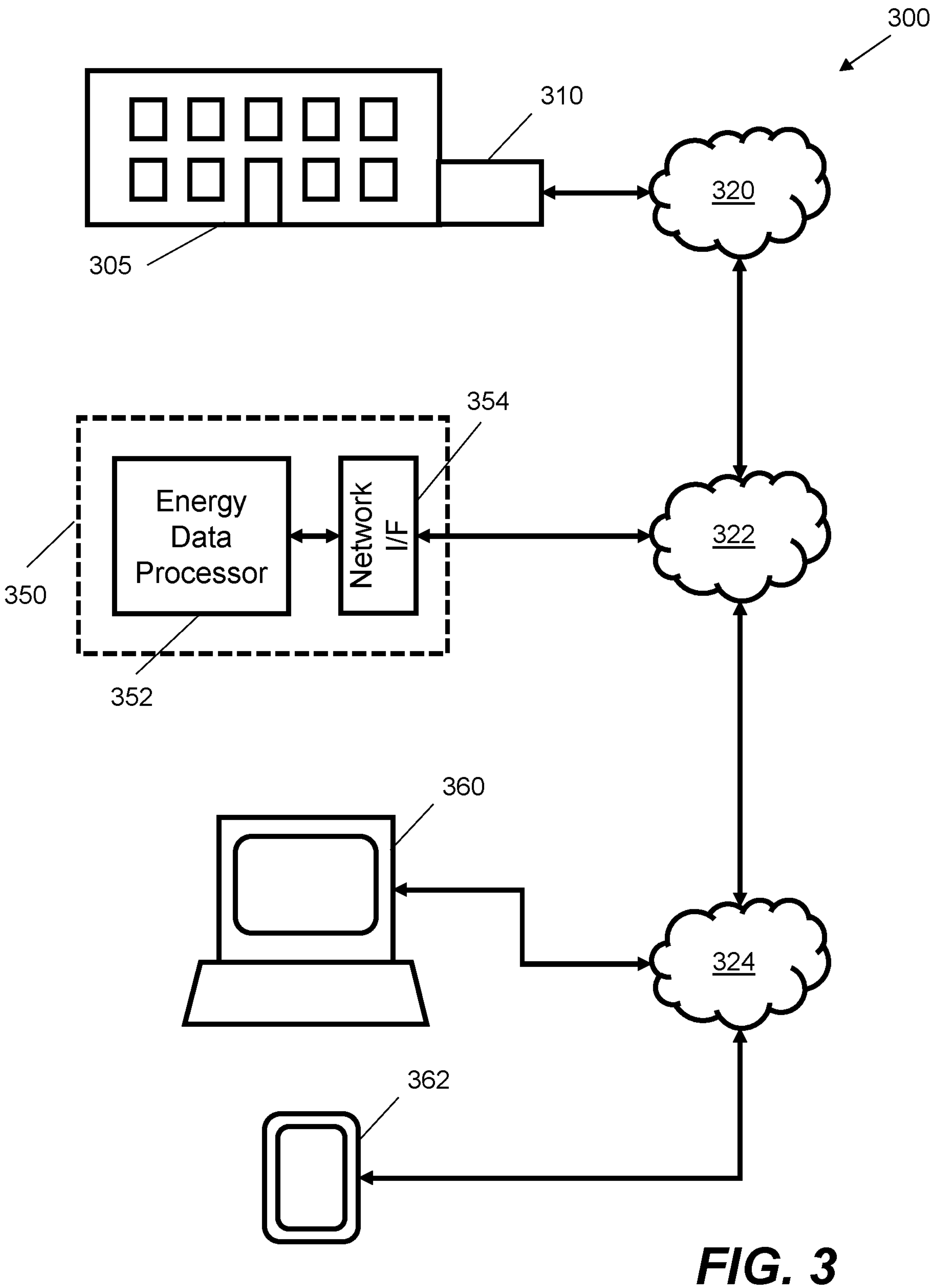
FIG. 3 is a schematic diagram showing networked components of an example system for the determination of energy consumption patterns for a building.

FIGS. 2 and 3 show two example contexts for an energy data processor. FIG. 2 shows how an example energy data processor may be incorporated into a smart meter that is locally installed within a building. FIG. 3 shows an example energy data processor that is located remotely (e.g., in relation to the building). Both contexts may be seen as alternatives and/or complementarily, e.g. in the latter case, a distributed energy data processor may have both local and remote processing components.

The example 200 of FIG. 2 shows an energy measurement device 210 and an energy data processing system 250. The energy measurement device 210 in this example is configured to measure electricity use, but other non-illustrated examples may measure liquid and/or gaseous fuel flow or other measures of energy consumption. The energy measurement device 210 in the present example is coupled to a neutral line 212 and a live line 214. Although this example shows an active coupling to these electricity lines (212 and 214), other measurement sensors may use a passive coupling, e.g. using electromagnetic approaches and passively induced fields and/or currents. The energy measurement device 210 comprises a current sensor 216 and a voltage sensor 218 that provide analogue measurement readings to an analogue-to-digital (A2D) converter 220. The A2D convertor 220 then digitalises the sensor readings (e.g., outputs an 8 or 16-bit reading) and provides this to a measurement processor 230. The measurement processor 230 is electronically coupled to a volatile random-access memory (RAM) 232 and a non-volatile erasable programmable read-only memory (EPROM) 234. Firmware stored in the EPROM 234 may be loaded into RAM 232 in operation and be executed by the measurement processor 230. Computer program instructions that are executed by the measurement processor 230 are configured to compute energy load data for output, e.g. in the form shown in FIG. 1. The energy measurement device 210 may thus be seen as a form of embedded computer. It should be noted that many different configurations are possible, and FIG. 2 is provided as an example to illustrate one approach to obtain energy load data.

In the example 200 of FIG. 2, the measurement processor 230 is communicatively coupled to an energy data processor 252 that forms part of the energy data processing system 250. The energy data processing system 250 also comprises a network interface 254 that is communicatively coupled to the energy data processor 252 (e.g., may be coupled via a systems bus). The network interface may comprise a known wired and/or wireless interface (such as a wired Ethernet interface or a wireless ZigBee®, Bluetooth® or Wi-Fi® interface). The network interface 254 may be used to communicate over a network 260. In FIG. 2, the energy data processing system 250 is shown as a separate sub-system and may be implemented as a configurable "upgrade" to a pre-existing smart meter that comprises the energy measurement device 210. In certain cases, e.g. for newer devices, the energy data processing system 250 may be included as part of the energy measurement device 210, e.g. the measurement processor 230 may be adapted to perform the functions of the energy data processor 252.

In use, the measurement processor 230 is configured (e.g., via processing of firmware loaded into the RAM 232) to compute an energy use metric based on the digitalised measurements from the current sensor 216 and the voltage sensor 218. The measurement processor 230 may be configured to poll the A2D converter 220 at regular, or otherwise determined, time intervals and obtain digital data values for measured current and voltage that may then be multiplied to obtain a power measurement. The power measurement may then be integrated or otherwise summed over the period of measurement to determine an energy use value in Watt-hours or kilo Watt-hours. The energy use value is then provided to the energy data processor 252 as energy load data, such as that shown in FIG. 1. In examples, different pre- and post-processing functions may be applied as necessary to generate energy load data in a desired format. The precise computations for the raw energy load data obtained by the energy data processor 252 do not form the focus of the present examples.

FIG. 3 shows an arrangement 300 that may be used for remote monitoring of energy consumption for a building 305. In the example of FIG. 3, the building 305 comprises a building services unit 310 that is communicatively coupled to a series of computer networks 320, 322 and 324. The building services unit 310 may comprise an energy measurement device such as device 210 in FIG. 2, wherein the energy measurement device comprises a network interface to couple it to the network 320 (e.g., similar to the network interface 254). In the example of FIG. 3, an energy data processing system 350 similar to the energy data processing system 250 of FIG. 2 is provided, but in this example the energy data processing system 350 is remote from the building 305 and the building services unit 310. The energy data processing system 350 comprises an energy data processor 352 and a network interface 354 as per the example of FIG. 2; however, in this case, the network interface 354 is communicatively coupled to network 322. The network interface 354 thus receives energy load data from the building services unit 310 via networks 320 and 322. Depending on the configuration the energy data processing system 350 may receive data continuously (e.g., every minute, 15-minutes or hour) or in batches (e.g., every day or every week). Either approach, or a combination of approaches, may be used.

In FIG. 3, the energy data processing system 350 is further communicatively coupled to a third computer network 324 that allows communication with one or more computing devices. In FIG. 3, a desktop computing device 360 and a mobile computing device 362 (such as a tablet or smartphone) are shown. The desktop computing device 360 and the mobile computing device 362 communicate with the energy data processing system 350 to obtain processed energy load data, e.g. for visualisation using a display of either device. In one case, a similar approach may also be used to communicate with the energy data processing system 250 of FIG. 2. In yet another case, the energy data processing system 250 of FIG. 2 may be coupled to a local display device for visualisation of the output of the energy data processing system 250. Those skilled in the art will appreciate that many different configurations of local, remote and distributed devices are possible, with many variations to those described in FIGS. 2 and 3, and the examples described below may be applied in multiple different circumstances.

Figure 4:
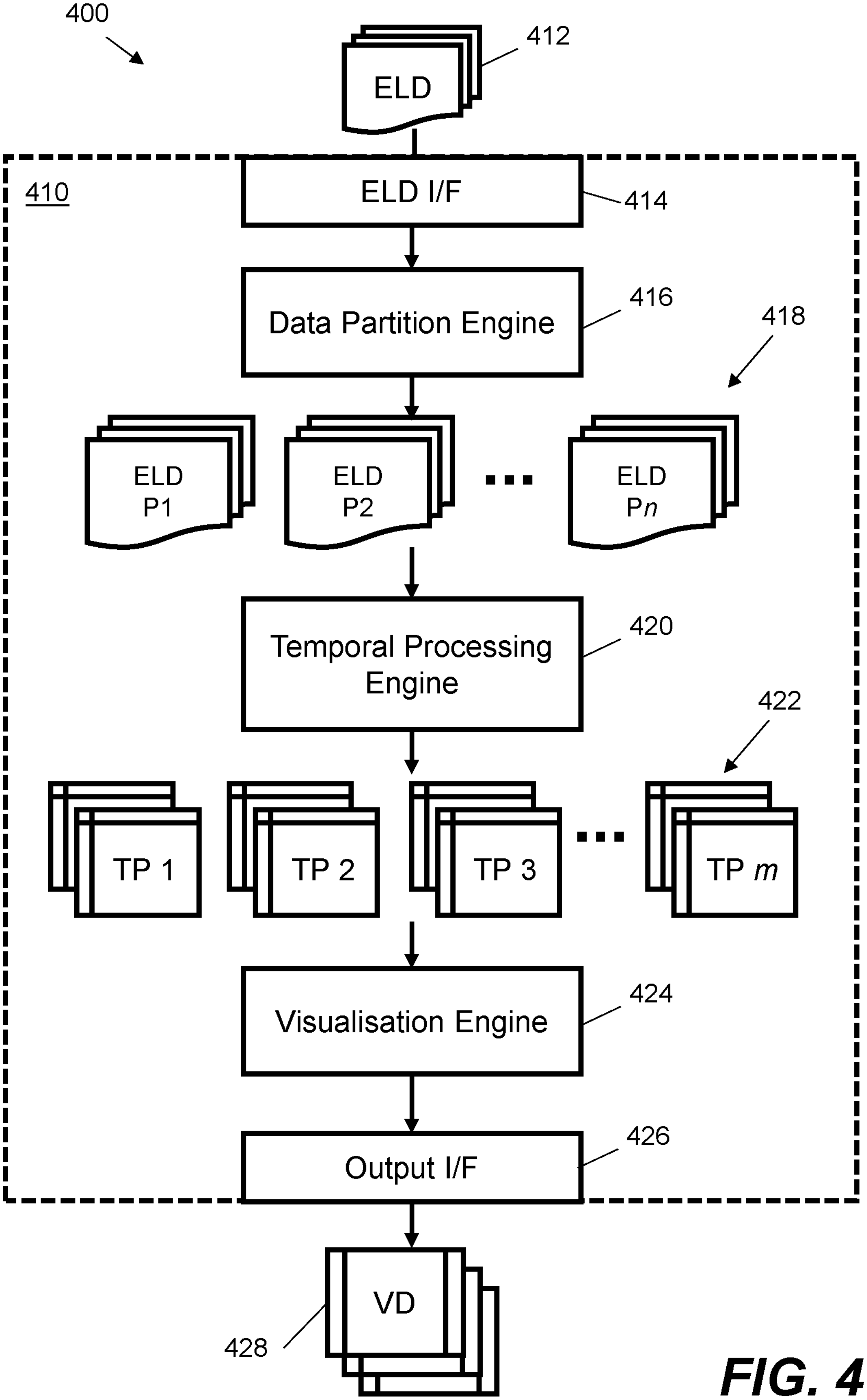
FIG. 4 is schematic diagram showing example components of an energy data processor.

FIG. 4 shows an example functional configuration 400 for an energy data processor 410, such as the energy data processor 252 of FIG. 2 and/or the energy data processor 352 of FIG. 3. The energy data processor 410 is configured to determine energy consumption patterns for a building. In certain cases, such as those similar to the example of FIG. 3, the energy data processor 410 may be configured to determine energy consumption patterns for a plurality of buildings. The energy data processor 410 is configured to operate on energy load data 412. This may comprise energy load data as described above and as shown in FIG. 1. The energy load data originates from energy use sensors for the building. For example, the energy load data 412 may be received from a locally coupled energy measurement device, such as device 210 in FIG. 2, or a remote energy measurement device that is communicatively coupled over a network, e.g. from a device installed in building services unit 310. The energy load data 412 may comprise time-series energy consumption measurements for the building. In certain examples, energy consumption may be measured for different fuel types, including, amongst others, electricity, natural gas, diesel, and propane. The example of FIG. 4 may be applied independently of the fuel type that is used within a building and may also be applied with a combination of multiple fuel types within a single building.

The energy data processor 410 of FIG. 4 receives the energy load data 412 at an energy load data interface 414. In certain cases, this may comprise a local systems interface, e.g. a systems bus that communicatively couples the measurement processor 230 and the energy data processor 252 of FIG. 2. In other cases, the energy load data interface 414 may comprise a memory or storage interface to receive the energy load data 412 from a communicatively coupled memory or storage device. This may be the case where energy load data 412 is received in batches from remote energy use sensors. In yet another case, the energy load data interface 414 may comprise a network interface such as network interface 354 in FIG. 3, whereby the energy data processor 410 receives the energy load data 412 over a network. Different configurations and combinations of configurations are possible, depending on the precise implementation. Energy consumption data may be measured and/or provided in various units. The units of measurement may depend on a fuel type being used. In certain examples, the energy load data interface 414 may include pre-processing functions that convert from a set of provided units into energy consumption values in kilo Watt-hours.

In one case, the energy load data interface 414 may comprise an application programming interface (API) for retrieval of energy load data 412. For example, utility companies may collect energy consumption data using one or more of the systems shown in FIGS. 2 and 3. The utility company may then allow for client-side requests to the API to retrieve the energy load data 412. In certain cases, these requests may be authorised by an owner or controller of the building. The utility company may provide a server-side API for access to their databases of energy load data and/or may provide the energy load data to one or more third parties. These third parties may then provide a server-side API and may be responsible for requesting energy load data from the utility company, cleaning and/or pre-processing this data and then making the data available to requests from the client-side energy load data interface 414. Different configurations for data access are possible depending on multiple factors including building, utility company, fuel type etc.

Returning to FIG. 4, the energy load data 412 is passed from the energy load data interface 414 to a data partition engine 416. The data partition engine 416 is configured to apply a clustering model to the energy load data to determine one or more partitions within the energy load data. The clustering model may comprise a supervised or unsupervised machine learning model. In certain implementations, an unsupervised machine learning model may be preferred, as this may be applied without requiring a training set of labelled samples. The partitions may comprise assigned groups or clusters of data samples. Constraints may be applied to the clustering model, such as partitions are to be continuous over time within the energy load data and/or prior probability distributions for the number of partitions. Partitions may be labelled by assigning a partition identifier to data samples within the energy load data 412, e.g. a first set of data samples may be assigned to a first partition with a partition identifier of "01" and a second set of data samples may be assigned to a second partition with a partition identifier of "02". In one case, a new data structure may be created, e.g. the same length as a one-dimensional array comprising a time-series of energy use values, to store a partition identifier for corresponding elements in the energy load data 412. In other cases, different data structures (e.g., different arrays) may be created to store the energy load data corresponding to each partition.

In FIG. 4, the data partition engine 416 is shown outputting a plurality of labelled partitions 418 of the energy load data. In FIG. 4 there are n partitions; n may comprise a value from 1 to a maximum number of partitions. The value n may be set by a user as part of the clustering model, or, preferably, may be determined from the energy load data 412 by the clustering model. The plurality of labelled partitions 418 are received by a temporal processing engine 420. The temporal processing engine 420 is configured to segment and aggregate the energy load data over a set of predefined time periods. The temporal processing engine 420 is independently applied to the partitions determined by the data partition engine, i.e. performs processing on a per-partition or partition-by-partition basis. In certain examples, the temporal processing engine 420 is applied in parallel and/or series to each of the labelled partitions 418 of the energy load data. In FIG. 4, the temporal processing engine 420 outputs a series of aggregated data sets 422; m data sets are shown. Each of these data sets 420 may relate to a different time period, e.g. different days of the week or different times of day. In FIG. 4, aggregated data sets are output for each of the determined partitions.

The aggregated data sets 422 are then received by a visualisation engine 424. The visualisation engine 424 is configured to generate visualisation data from the output of the temporal processing engine 422, i.e. from the aggregated data sets 422. The generation of visualisation data may comprise formatting the data within the aggregated data sets 422 for display. The visualisation data may comprise charts and/or visualised metrics for display on a display of a smart meter (e.g. for local display) and/or for display on remote devices, such as the displays of the desktop computing device 360 and mobile computing device 362 of FIG. 3 (e.g. effectively implementing a remote smart meter). In FIG. 4, the energy data processor 410 comprises an output interface 426 that receives the visualisation data from the visualisation engine 424 and outputs this as visualisation data 428 for display. In a similar manner to the energy load data interface 414, the output interface 426 may comprise a local systems interface, a memory or storage interface and/or a network interface depending on the implementation. In certain cases, different output interfaces may be provided, e.g. visualisation data 428 may be output for local display and may be sent over a network for remote display. The visualisation data 428 need not be displayed at the time of output, it may be buffered and/or otherwise stored for later on-demand retrieval. The visualisation data 428 comprises respective sets of data for the determined n partitions.

The operation of certain components shown in FIG. 4 will now be described with reference to more detailed examples. Examples of the partitions 418, the aggregated data sets 422 and the visualisation data 428 will also be provided.

Figure 5:
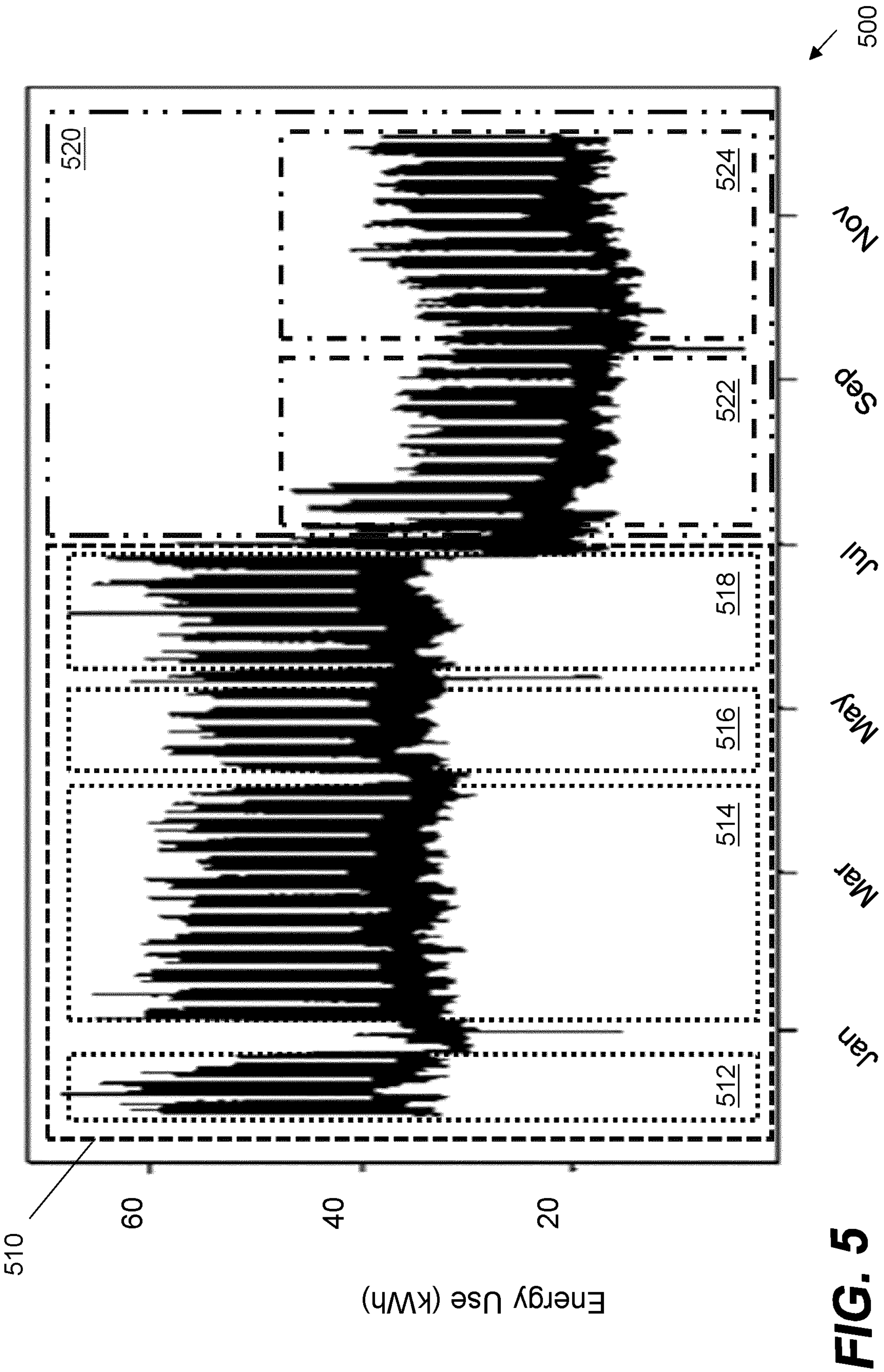
FIG. 5 is a visualisation of an example partitioned set of energy load data.

FIG. 5 shows a visualisation 500 of data output by the data partition engine 416 of FIG. 4. The underlying energy load data is that shown in FIG. 1. FIG. 5 thus shows an application of the data partition engine 416 to the energy load data 110 of FIG. 1. FIG. 5 illustrates two partitions that are deemed to be present by the data partition engine 416: a first partition 510 shown within a dashed line running from the start of the chart to July and a second partition 520 shown within a dash-double-dot line running from July to the end of the chart. At a data level, the partitions may be assigned by assigning a partition identifier to individual data elements or samples within the energy load data—e.g. data samples from January to July may be assigned a partition identifier of "01" whereas data samples from July to December may be assigned a partition identifier of "02". These underlying identifiers may be used to generate visualisation data for display to a user in a similar form to FIG. 5.

The example of FIG. 5 also shows how the data partition engine 416 may apply a clustering model that does not assign partition identifiers to all data samples and/or that applies a probabilistic classification for labelled data samples. In the latter cases, a number of partitions may be defined by the clustering model and, for at least a subset of data samples, each sample may be assigned a probability for each of the number of partitions (e.g., as a values in a probability vector or array). In this case, the data partition engine 416 may further apply a post-processing function to process assignments and/or probability values and output a final or one-hot assignment to a particular partition. For example, in FIG. 5, data samples in groups 512, 514, 516 and 518 are assigned (or have a high probability of assignment) to a first partition and data samples in groups 522 and 524 are assigned (or have a high probability of assignment) to a second partition. Data samples that fall outside of these groups may have no assignments and/or probability values below a predefined threshold. In this case, the post-processing function processes the assignments for the data samples to assign data samples to continuous groups representing the partition 510 and the partition 520. In one case, a particular partition for a given data sample may be selected based on a maximum likelihood, e.g. a largest probability value across multiple partitions.

In certain examples, the clustering model applied by the data partition engine 416 may comprise a probabilistic mixture model. In this case, each partition may be associated with a particular mixture in the probabilistic mixture model. Each mixture may have a set of parameters that define the mixture (e.g., that define a probability distribution for the mixture). In a preferred case, the probabilistic mixture model comprises a Gaussian mixture model. In a Gaussian mixture model, different partitions may be defined as different Gaussian probability distributions (e.g., with different mean and covariance parameters), where each Gaussian probability distribution may also have a probability for any given data sample. In this case, the data partition engine 416 may apply an expectation maximisation function to determine parameters for the Gaussian mixture model. These parameters may then be used to apply a partition identifier to each data sample (e.g., based on a probability of each data sample belonging to each Gaussian probability distribution).

In the case that a Gaussian mixture model is applied, the data partition engine 416 may be configured to apply Bayesian inference to infer probabilistic distributions for the parameters of the Gaussian mixture model. For example, Bayesian methods of variational inference may be used that optimises a lower bound on model evidence including Gaussian mixture priors (i.e. the probabilities of each Gaussian probability distribution). Bayesian inference may use a Dirichlet distribution to model the mixture priors. Bayesian methods of variational inference may provide for improved modelling of the number of partitions, by down-weighting certain mixtures more effectively and so reducing the number of partitions that are deemed to be present; from testing, this approach appears to better match human intuition for the number of partitions that are present. Bayesian methods may be more resource intensive, and so may be preferred if suitable computing resources are available, e.g. may be better suited to remote server implementations that are shown in FIG. 3. Gaussian mixture model fitting methods, including Bayesian methods, may be implemented using machine learning libraries, such as scikit-learn or Matlab® and/or via custom programmed implementations. Default parameters for these methods may be used with appropriate variations depending on the implementation. The results shown in FIG. 5 were generated by applying a Bayesian Gaussian mixture model. In a test case, the BayesianGaussianMixture method of the scikit-learn package was used with a number of initializations (n_init) equal to 20, a convergence threshold/tolerance of 1e−3, a "full" convergence type (each partition/component has its own general covariance matrix), a maximum number of expectation maximisation iterations (max_iter) of 500, the use of k means to initialise the weights (init_params="kmeans"), and a Dirichlet process (or so-called "stick-breaking process") for the weight concentration prior (weight_concentration_prior_type="dirichlet_process").

When applying a Bayesian Gaussian mixture model, a number of mixture components (i.e. partitions) may be set based on knowledge of the energy load data. This may represent a maximum number of components whereby the Bayesian estimation may determine that an actual number of components is less that the maximum number of components. In the BayesianGaussianMixture method of the scikit-learn package this may be set using the n_components parameter. The number of components may thus represent an upper bound on the number of components to aid computational efficiency. In one case, a number of mixture components may be based a minimum time span for a partition within time-series energy consumption data. For example, a minimum time span may be set as a particular number of days within the time-series energy consumption data. In test cases, it a minimum number of days was set at 90 days (approximately 3 months) such that longer term changes across a year are identified. In this case, for a years' worth of data, the (maximum) number of mixture components may be set as 4 (i.e. 365/90). In certain cases, post-processing of the partitions may tend to reduce a number of final partitions that are output—hence, often the number of output partitions is less than the (maximum) number of mixture components. It should also be noted that although a number of components may be predefined, weights for some of these components may be set to 0, such that even if the number of components is set to 4, 5 or 10 over a given time period, only one partition may be determined to be present (e.g., only one partition may have non-zero weights and/or a suitably high probability value). The details here are intended for example only based on a test case, different hyper-parameter configurations from those described may be used for different implementations, for different buildings and for different sets of energy load data, amongst others.

Figure 6A:
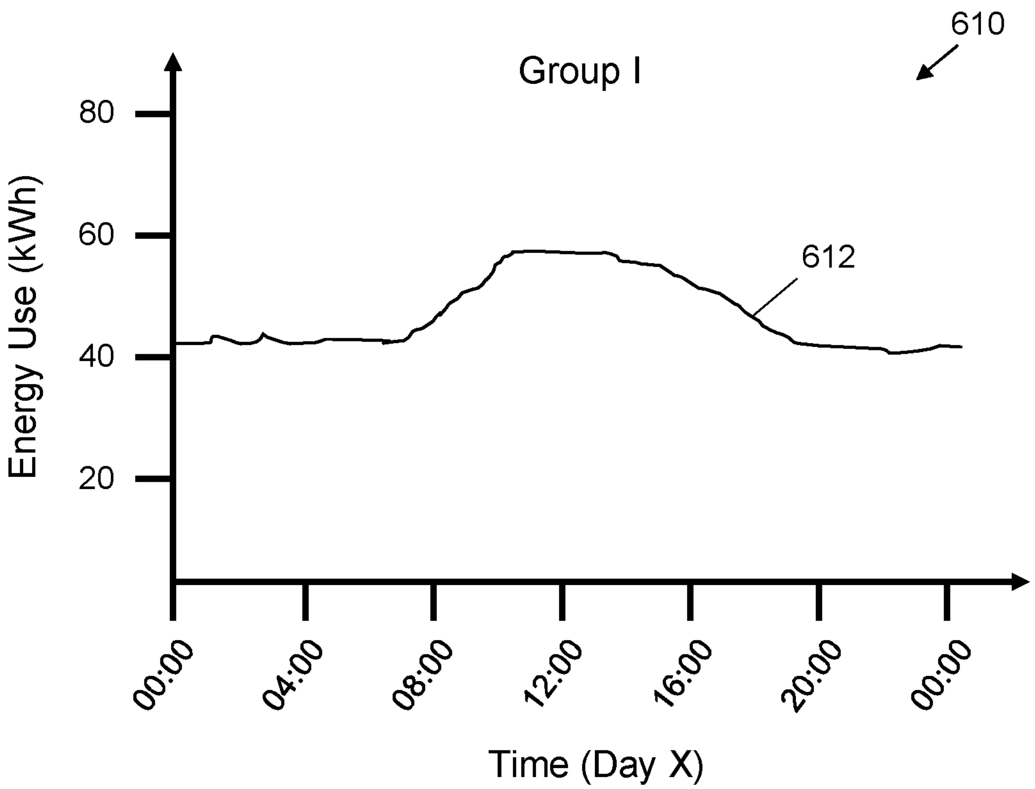
FIGS. 6A and 6B are visualisations showing how energy use varies with time of day for respective first and second partitions of an example set of energy load data.
Figure 6B:
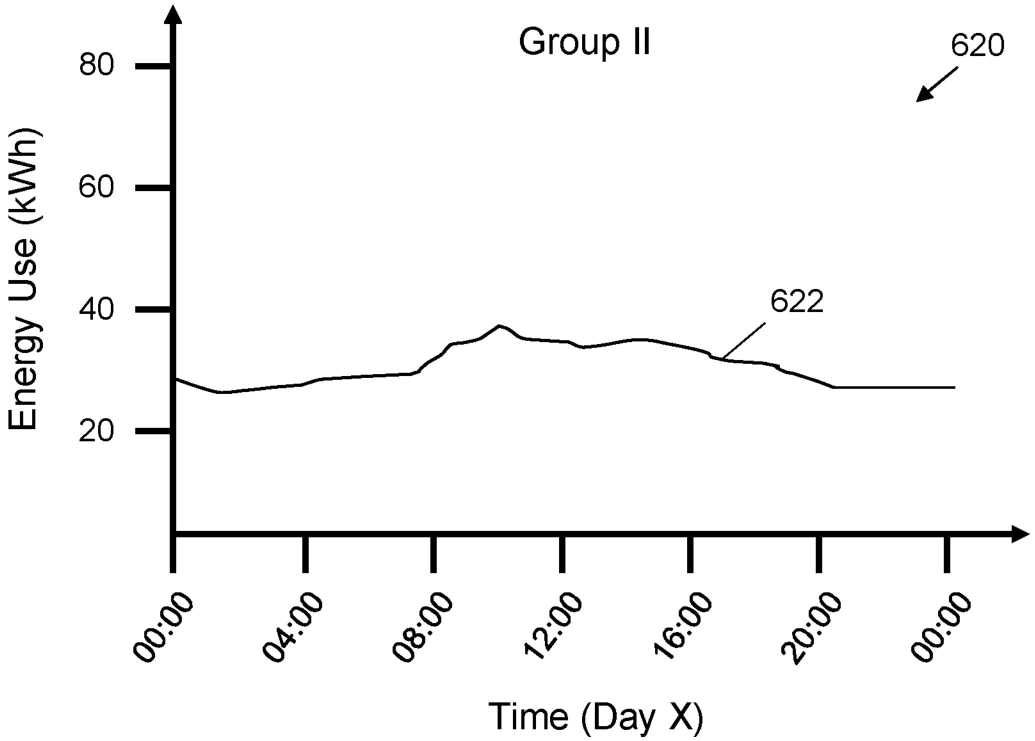

FIGS. 6A and 6B show a visualisation of example data output by the temporal processing engine 420. In this case, the temporal processing engine 420 is configured to group the energy load data within each partition into data associated with each day of the week. For example, the data for a first partition may be grouped into data associated with each of the named days of the week (i.e. Monday, Tuesday, Wednesday, Thursday, Friday, Saturday and Sunday). This may be performed by applying a day-of-the-week look-up operation to a time/date-stamp associated with each data sample. FIGS. 6A and 6B show examples for each of the two partitions 510 and 520 shown in FIG. 5. These are labelled as "Group I" (i.e. partition 510) and "Group II" (i.e. partition 520). FIGS. 6A and 6B show respective charts 610, 620 of energy use (in kWh on the y-axis) as a function of time of day (24-hour time on the x-axis). The data for a particular day of the week (day "X", which may be a weekday) is shown.

The temporal processing engine 420 in the case of FIGS. 6A and 6B collates data samples in each of the partitions. It first groups the data samples by day-of-the-week and then by time of day. This results in a collection of data samples across each partition period for each day, where corresponding times in each named day are grouped (e.g., 08:00 on Tuesday for partition 1 will have a plurality of data samples where the energy use data 412 may be originally supplied in minute, 15-minute or hourly samples). An aggregated energy use metric may then be computed for each time-group, e.g. a summated energy use for a plurality of times in a named day. Values of this aggregated energy use metric for day X are shown as line 612 for Group I and line 622 for Group II. In one case, the aggregated energy use metric as shown as lines 612 and 622 may be output for display in a similar manner to FIGS. 6A and 6B, e.g. on a smart meter or mobile computing device display. It should be noted that without the partitioning of the energy load data, it would not be possible to provide the aggregated energy use metrics as shown. For example, line 612 has a different baseline level to line 622 (e.g. around 40 and 25 kWh respectively). An aggregated energy use metric across the whole of the energy load data 412, e.g. the whole of FIG. 1, would not produce coherent results for use in determining energy usage patterns. However, using the above described energy data processor, patterns of energy use are visible in the processed data for the two partitions.

Figure 7:
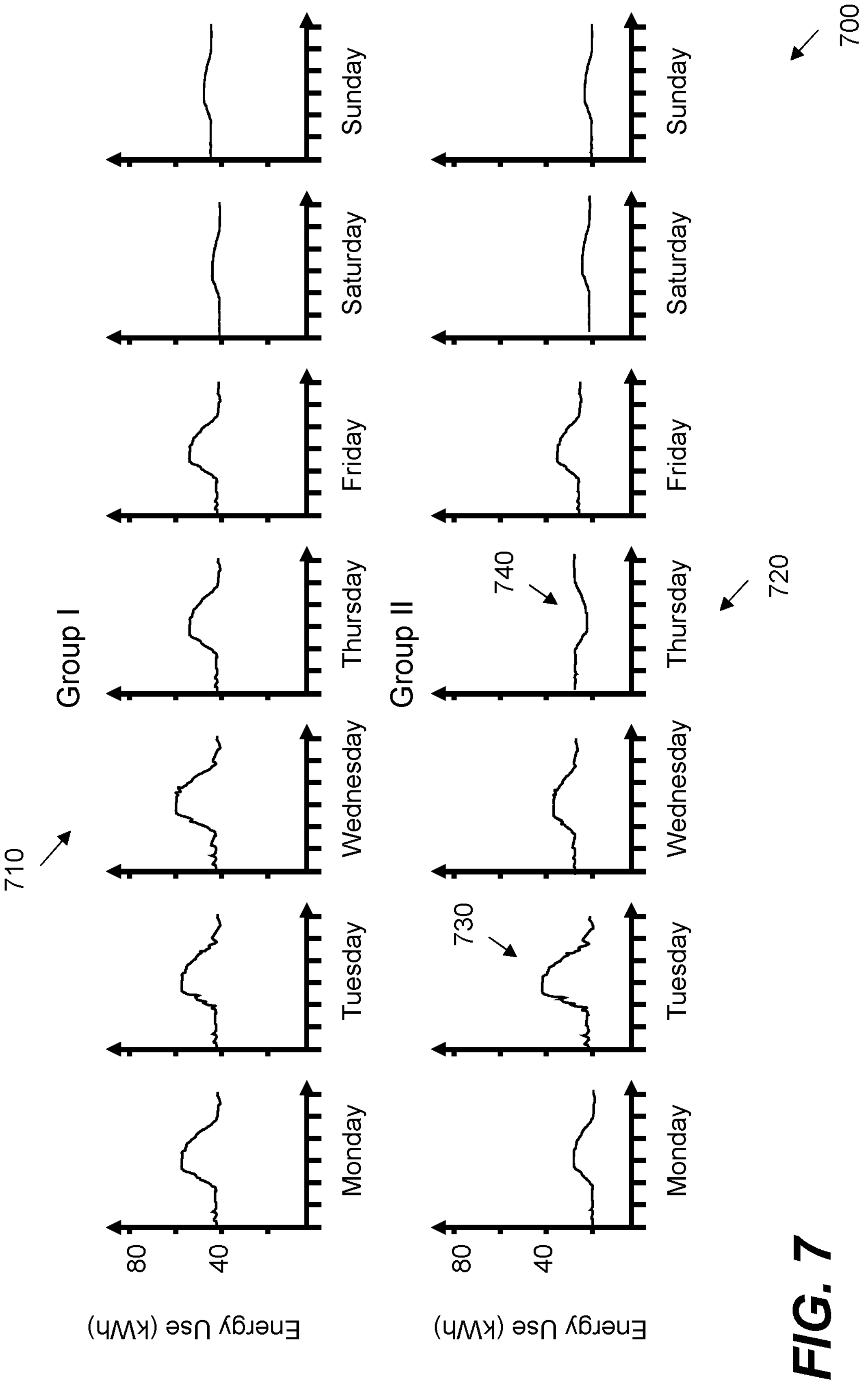
FIG. 7 is a visualisation showing how energy use varies with days of the week for the first and second partitions of an example set of energy load data.

FIG. 7 shows one possible set of visualisation data 428. In this case, mean energy use 700 is shown across the time of a set of named days in the week (Monday to Sunday). The Group I or first partition data is shown at the top 710 and the Group II or second partition data is shown at the bottom 720. The visualisation data 428 shown in FIG. 7 may be displayed on the display of a local smart meter and/or accessed via the Internet by a client computing device. Due to the processing of the energy data processor 410, it becomes possible to detect variations in energy use in the Group II data that would otherwise be hidden, such as the higher use on Tuesday shown by 730 or the lower use on Thursday shown by 740.

Figure 8:
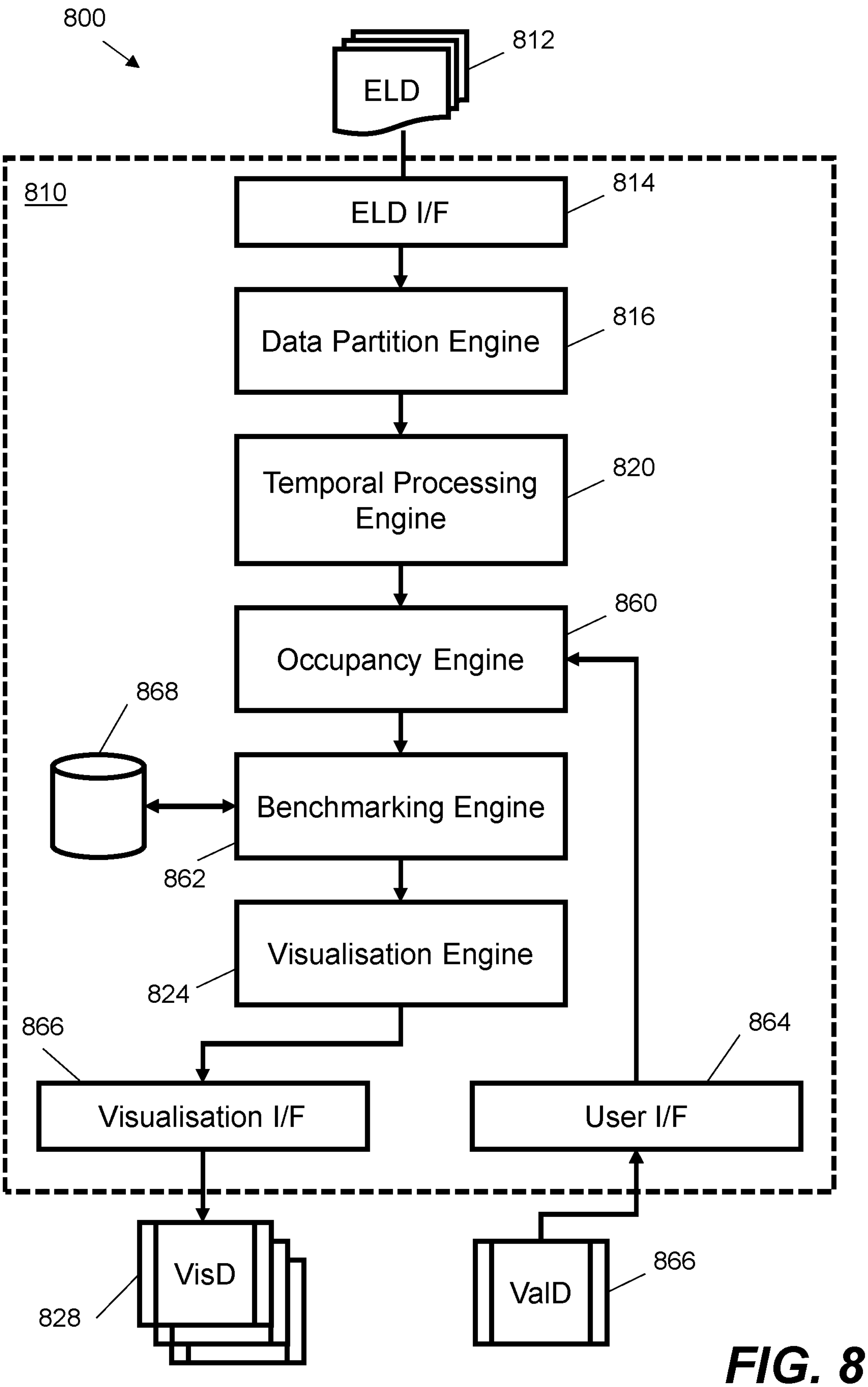
FIG. 8 is schematic diagram showing example components of another energy data processor.

FIG. 8 shows a variation 800 of the energy data processor 410 of FIG. 4. As per the example of FIG. 4, the energy data processor 810 comprises an energy load data interface 814, a data partition engine 816, a temporal processing engine 820, and a visualisation engine 824. These components have functions similar to those described with reference to FIG. 4. In the present case, the outputs of each component have been omitted for clarity. In addition to the components of FIG. 4, the energy data processor 810 of FIG. 8 further comprises an occupancy engine 860 and a benchmarking engine 862. Although these are shown as part of a common implementation in FIG. 8, they may also be implemented as separate additions in other examples.

The occupancy engine 860 is configured to receive the output of the temporal processing engine 820, e.g. a series of aggregated data sets as visualised in FIG. 7, and to estimate periods of occupancy for the building using this data. For example, if the building is an office, school or factory there may be periods of time when the building is occupied, i.e. there are people within the building, and the level of occupancy may change over time and with the days of the week. Furthermore, a public building such as a library or hospital may have a different occupancy profile to a warehouse, office or shop. The periods of occupancy may then be used by the visualisation engine 824 to generate the visualisation data 828.

In a preferred example, the occupancy engine 860 separately processes data for each of a set of partitions that is output by the temporal processing engine 820 to determine an "operational pattern". In this case, the occupancy engine 860 receives data as illustrated in FIG. 7 and performs a threshold-based processing of this data to output a set of normalised use values. For example, the normalised use values may be within a range of 0 to 1. The threshold-based processing may set at least a lower threshold and an upper threshold. Energy consumption values (e.g. as shown in the charts of FIG. 7) below the lower threshold may be set to 0 and energy consumption values above the upper threshold may be set to 1. One or more of the lower and upper thresholds may be based on predefined percentiles of the energy consumption values (e.g. as output in the aggregated data sets). In one case, the upper threshold may be set as an $85^{th}$ percentile for the partition (e.g., the $85^{th}$ percentile across data for the set of 7 days—i.e. across the row of 7 days 710 for the first partition or across the row of 7 days 720 for the second partition). In this case, the lower threshold may be set as an adjusted $5^{th}$ percentile. The adjustment may be based on a range between an upper and lower percentile. For example, the lower threshold may be determined as $P_5+0.25*(P_{95}-P_5)$ where $P_5$ and $P_{95}$ are respectively the $5^{th}$ and $95^{th}$ percentiles of energy consumption values for each partition (e.g., as shown in FIG. 7). Values between the lower and upper thresholds may then be scaled linearly (e.g., normalised to lie on a range of between 0 and 1 by subtracting the lower threshold and then by dividing by the difference between the upper and lower thresholds). Again, processing is performed per partition (i.e., on a partition-by-partition basis). The result of this threshold-based processing is a set of data for the days of the week for each partition that is scaled from 0 to 1; this is referred to as the "operational pattern". The operational pattern may then form the basis for a binary discrimination to determine occupancy. For example, a binary threshold may be applied to the operational pattern data to output values of 0 or 1 indicating unoccupied and occupied respectively. The binary threshold value may be predefined and may vary based on implementation (in tests, values within an approximate range of ~0.1 to ~0.3 were used).

In another case, the occupancy engine 860 may apply one or more clustering models in a similar manner to the temporal processing engine 820. For example, the occupancy engine 860 may apply a Gaussian mixture model with a fixed number of mixtures. In one case, two mixtures may be defined corresponding to each of "occupied" and "not occupied". As described above, post-processing may be applied, and/or the hyperparameters of the clustering model configured, to constrain the "occupied" period to be a continuous sequence of data samples. For certain buildings, the occupancy periods may not be continuous (e.g., may be split into separate morning and afternoon periods). In certain cases, Bayesian Gaussian mixture models may be applied with prior parameters set based on wide-ranging building properties (in this case, a conservative number of periods may be determined automatically).

Figure 9A:
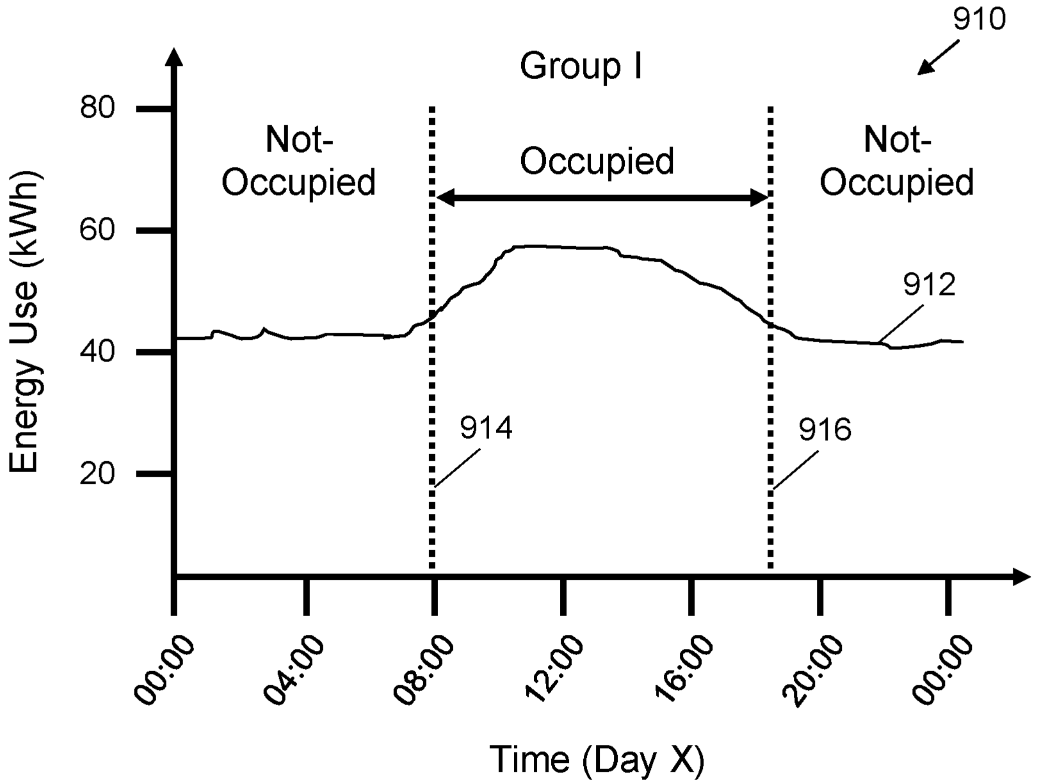
FIGS. 9A and 9B are visualisations showing how partitioned energy load data may be used to determine occupancy data for a building.
Figure 9B:
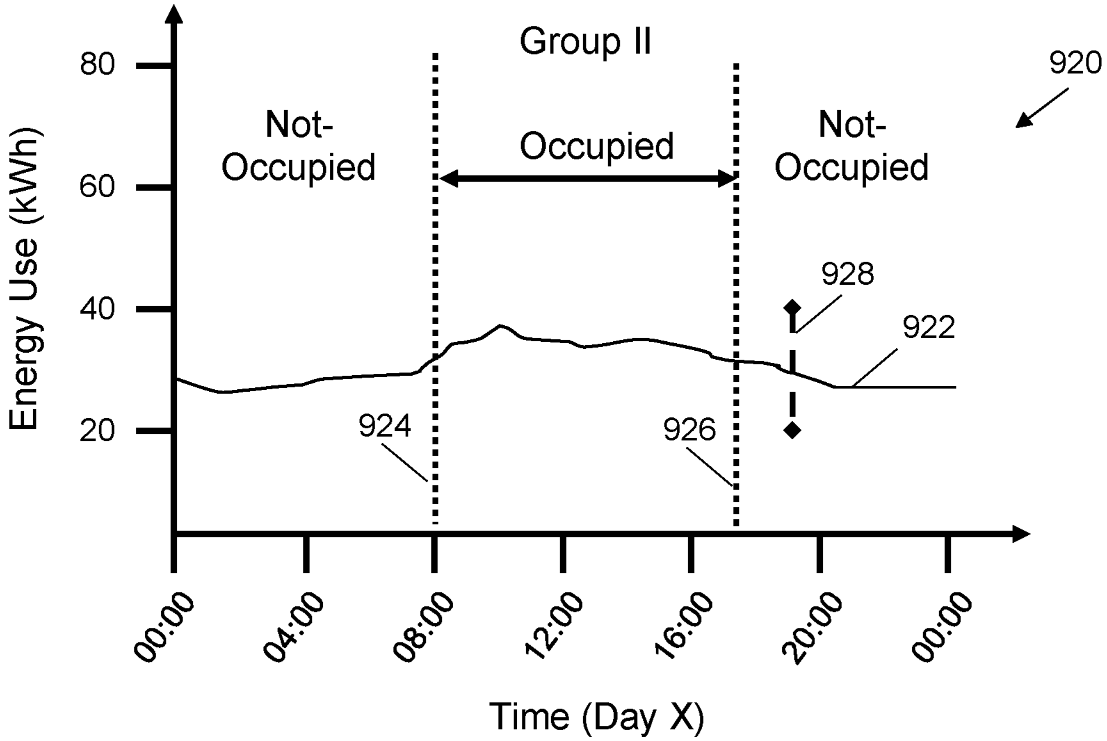

FIGS. 9A and 9B respectively show the data of FIGS. 6A and 6B with marked periods of occupancy as determined by the occupancy engine 860. In FIG. 9A, the data for Group I is shown in chart 910 with the energy use metric shown as line 912. In this chart 910, data samples up to point 914 are assigned to a "not occupied" class, data samples between point 914 and 916 are assigned to an "occupied" class, and data samples beyond point 916 are assigned to the "not occupied" class again. As described above, assignments may be performed based on a binary threshold or probabilistically (e.g. with class probability vectors), with one-hot vectors for each class and/or via a separate data structure with multi-class identifiers. If one or more separate data structures are used for the assignment of occupancy labels, these may be the same length as the original energy use metric 912 such that data elements correspond. FIG. 9B shows a corresponding assignment for chart 920 representing the Group II data, as shown via line 922. In this case, data samples up to point 924 are assigned to a "not occupied" class, data samples between point 924 and 926 are assigned to an "occupied" class, and data samples beyond point 926 are assigned to the "not occupied" class again.

In one case, the output of the occupancy engine 860 may be used as-is. In certain cases, the occupancy assignments may be provided to a user for confirmation and/or correction. This may be performed using the user interface 864 shown in FIG. 8. In this case, the visualisation data 828 may comprise an indication of estimated periods of occupancy as output by the occupancy engine 860 and the user interface 864 may receive validation data 866 relating to these periods from a user. The validation data 866 may indicate whether the occupancy assignments from the occupancy engine 860 are confirmed and/or whether they are to be adjusted. For example, in FIG. 9B, a user presented with visualisation data similar to chart 920 may use the user interface 864 to change the occupied/unoccupied boundary from point 926 to point 928. This new boundary location may then be received as the validation data 866 and used by the occupancy engine 860 to update the occupancy period assignments prior to further use of the occupancy data.

In one example, the occupancy data output by the occupancy engine 860 may be used by the visualisation engine 824 to generate visualisation data 828 that is output via a visualisation interface 866. The visualisation interface 866 may perform functions similar to the output interface 426 of FIG. 4. For example, the occupancy data determined by the occupancy engine 860 may be visualised on a local or remote display as shown in FIGS. 9A and 9B. In certain cases, it may be added as an overlay to a dashboard similar to that shown in FIG. 7. In addition to the use in visualisation, or instead of this use, the occupancy data 860 may also be used as an input to further data processing of the energy load data. In the example of FIG. 8, the occupancy data is used by the benchmarking engine 862 to output at least one energy efficiency metric for the building, where the metric is benchmarked using data for buildings other than the building currently being analysed.

In the example of FIG. 8, the benchmarking engine 862 has access to a data storage device 868 that stores processed energy load data for a plurality of buildings. In an implementation such as that shown in FIG. 3, the energy data processor 810 may be configured to receive energy load data for a plurality of different buildings (e.g. via network or networks 320 and 322). In this case, the temporal processing engine 820 may be applied to each of the plurality of buildings and an output stored within the data storage device 868. Hence, for a particular building being processed, at least one energy efficiency metric may be determined using an output of the temporal processing engine 820 as applied to the plurality of buildings. The at least one energy efficiency metric may then form part of the visualisation data 828 generated by the visualisation engine 824. In other cases, processed energy load data from separate energy data processors (such as 252 in FIG. 2) may be exchanged over a network such that any one energy data processor has access to data for a plurality of buildings.

Figure 10:
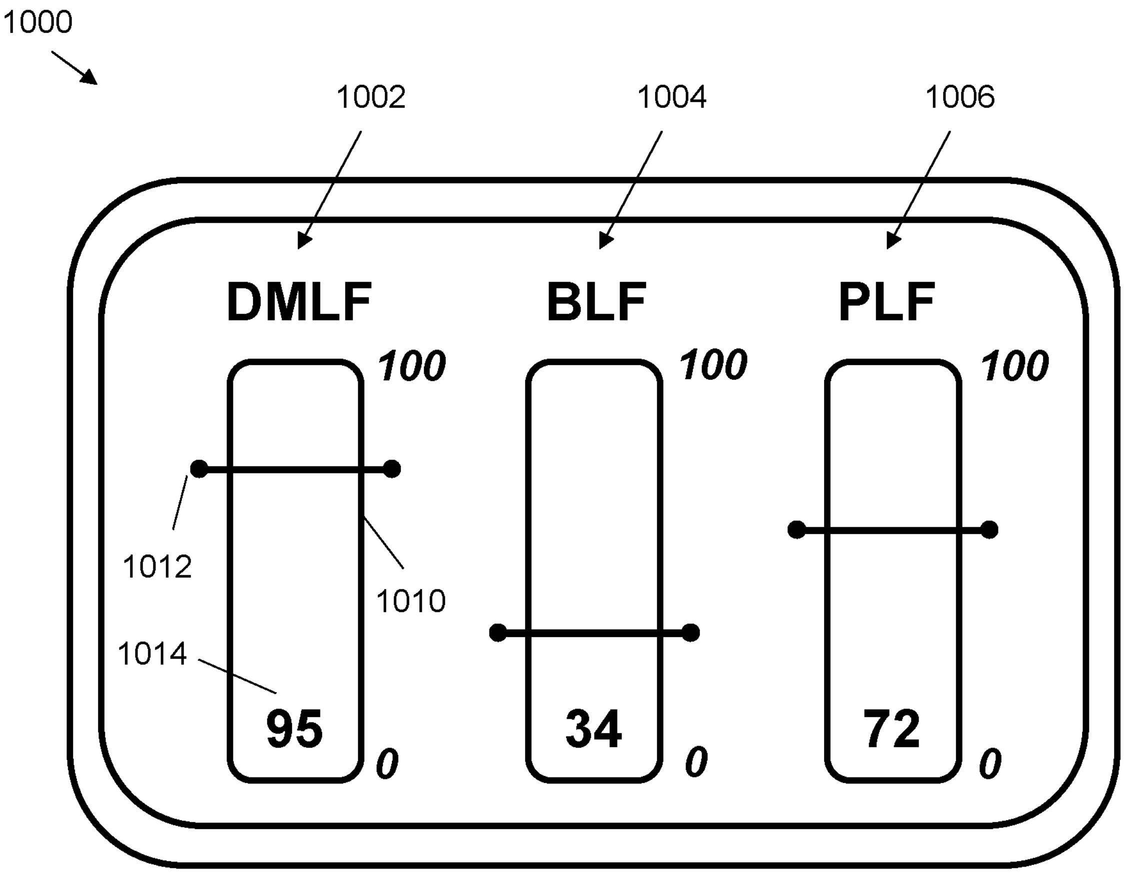
FIG. 10 is a schematic diagram showing an example dashboard of energy use metrics as generated by an example benchmarking engine.

FIG. 10 shows an example 1000 of three energy efficiency metrics 1002, 1004, 1006 that may be computed by the benchmarking engine 862. Although three specific metrics are shown in FIG. 10, in other examples different metrics or different combinations of metrics may be determined. In the example of FIG. 10, the three energy efficiency metrics comprises energy efficiency scores for the building within a predefined range 1010. In this example, the predefined range runs from 0 to 100 (or in some cases 1 to 100) and represents a relative rank or percentile for the current building as compared to the plurality of buildings, i.e. the predefined range indicates a relative range of energy efficiency scores for the plurality of buildings. In the present case, 100 represents a best performing building and 0 or 1 represents a worst performing building. Other ranges are possible (e.g. 1 to the number of buildings or 0 to 10). A score above 75 may represent "good" performance. Using a predefined range based on processed data for a plurality of buildings thus provides a simple representation of the energy efficiency of a building, without requiring knowledge of an absolute range of values. In FIG. 10, each energy efficiency metric value is shown as a point 1012 on the predefined range 1010 and as a number 1014 at the bottom of the range 1010. In other examples, just one of the point 1012 or the number 1014 may be used to display the energy efficiency metric value.

In the example of FIG. 10, the three energy efficiency metrics comprise: a daily mean load factor (DMLF) 1002 representing energy consumption for the building over a daily time period; a base load factor (BLF) 1004 representing a constant low-level energy consumption for the building; and a peak load factor (PLF) 1006 representing a maximum energy consumption for the building.

The daily mean load factor 1002 may be determined based on a segmentation of the energy load data over one or more named days within a week. For example, the daily mean load factor 1002 may be computed as the mean of data for each of the days shown in FIG. 7 for the current period (e.g. Group II), as compared to the same mean computation for a plurality of other buildings. The mean may be a mean of the total energy use over the day, e.g. where the energy consumption for each day in each partition is summed and then averaged. Or, in other words, for each partition, the energy consumption values are summed over every day (e.g., over each sub-chart in FIG. 7) and then the mean of the daily sums is computed for each partition. This then provides a daily mean load factor for each partition. These per-partition daily mean load factors may then be combined to determine a daily mean load factor across the set of partitions. In one case, the per-partition daily mean load factors may be weighted based on a number of data points in each partition, e.g., if one partition has 100 points and the other has 200, the former will have a weight of 33% and the latter of 67%.

In certain examples, the mean of the data may be normalised for buildings of different sizes, e.g. by dividing by the building area. An area-normalised mean may allow better comparisons between buildings of different sizes.

As such the daily mean load factor 1002 may provide an indication of the daily average energy consumption for a building as compared to a set of peer buildings (e.g., buildings of a shared building type and/or within a predefined location). A low value for the daily mean load factor 1002 (i.e., towards 0 or 1) indicates that, on average, a building being analysed consumes more energy than the set of peer buildings; a higher value (e.g., above and particularly above 75) represents good energy management within the building. In this case, the temporal processing engine 820 may be configured to segment the energy load data over one or more named days within a week and to determine the average rate of energy consumption as an aggregate measure for each of the one or more named days.

The base load factor 1004 indicates a constant level of energy consumption in the building. This may represent energy consumed by essential equipment and building services. A low value for the base load factor 1004 (i.e., towards 0 or 1) indicates that, potentially, a larger part of the buildings energy consumption is due to non-weather factors such as occupancy and usage of equipment and appliances; a higher value (e.g., above 50 and particularly above 75) represents good energy management within the building, e.g. that constant drains on power are switched off when not required. In one case, the occupancy data generated by the occupancy engine 860 may be used to determine the base load factor 1004. For example, the base load factor 1004 may comprise a mean across all days of unoccupied time periods. In one case, a base load factor for each partition may be computed by taking the Xth percentile of energy load for each day (e.g., the Xth percentile of the set of energy consumption values for each day for each partition as shown in FIG. 7) and then taking the mean of the base load factors across the set of days. In a test case, X was set at 15 but may be configurable according to the implementation. As for the daily mean load factor, the base load factors are determined in this way for each determined partition and then may be combined into a single base load factor 1004 across the set of partitions. This may be the mean or weighted mean across the set of partitions (e.g., weighted according to a number of data points as described above).

The peak load factor 1006 indicates an estimate of the maximum energy load for the building. The peak load factor 1006 may be determined based on a combination of weather-based and non-weather-based loading. A low value for the peak load factor 1006 (i.e., towards 0 or 1) indicates that, potentially, there are opportunities to reduce consumption and that equipment and appliance at given times may warrant further investigation; a higher value (e.g., above 50 and particularly above 75) represents good energy management within the building, e.g. that the current building has a lower peak load than its peers. The peak load factor 1006 may be determined in a similar manner to the base load factor 1004; e.g., a Yth percentile of energy load for each day may be determined for each partition and then a mean across the partition may be determined. In a test case, Y was set at 95 but may be configurable according to the implementation. Per partition peak load factors may be averaged across the set of determined partitions as described above. In one case, the occupancy data generated by the occupancy engine 860 may be used to determine the peak load factor 1006. For example, the peak load factor 1006 may comprise a predefined upper percentile (e.g., top 90% or 95% of energy use) over the occupied periods.

In certain examples, the energy efficiency metrics 1002 to 1006 may be updated during the day based on received energy load measurements. This then allows continuous feedback for improvements to energy efficiency. The energy efficiency metrics 1002 to 1006 provide a fast and simple tool for identifying inefficiencies in buildings and provide guidance for areas where energy use may be reduced. In certain cases, both the energy efficiency metrics 1002 to 1006 and dashboards similar to any one of FIG. 6A, 6B, 7, 9A or 9B may be viewable by a user, e.g. as different selectable displays using a user interface such as 864.

In the above variation, occupancy data is determined from processed energy load data, and this in turn is used for further processing of the energy load data. The presence of occupants has been found to significantly influence the energy consumption of a building, and thus generating data that indicates periods of occupancy is useful for improving building energy performance evaluations. Within the above examples, occupancy data may be determined automatically using the energy load data as input. This then avoids the need for additional sensor systems to provide monitored occupancy data and acknowledges the reality that monitored occupancy data is not commonly available for majority of buildings. The variation above also avoids a need to rely on standard default assumptions regarding occupancy, e.g. assumptions that are made based on the specified building usage type. These assumptions are often inaccurate and corrupt the resulting analysis of the energy load data. For example, many comparative energy load analysis systems assumes full occupancy from 9 am to 5 pm, but the inventors have found this is inconsistent with much of the real-world energy load data (e.g., as is illustrated by FIGS. 6A, 6B, 9A and 9B).

In certain variations, the benchmarking engine 862 may group buildings for comparison. For example, the ranges shown in FIG. 10 may represent values for other buildings within a selected group of buildings. In one case, buildings may be grouped by one or more of climate zone, building type and/or location. The group of buildings for benchmarking may be selectable by a user. Climate zones may be defined based on national climate standards and/or best practice, such as the climate zones set out in the Guide to Determining Climate Regions by County (Volume 7.3) as published by Pacific Northwest National Laboratory of the U.S. Department of Energy, August 2015, which is incorporated herein by reference. In one case, a user may define their own group of buildings for comparison. For example, a user may control a portfolio of buildings and wish to compare buildings within this portfolio. Building type may be a type from a predefined set of types (e.g., 16 types such as Office, Restaurant, Warehouse, etc.).

Figure 11:
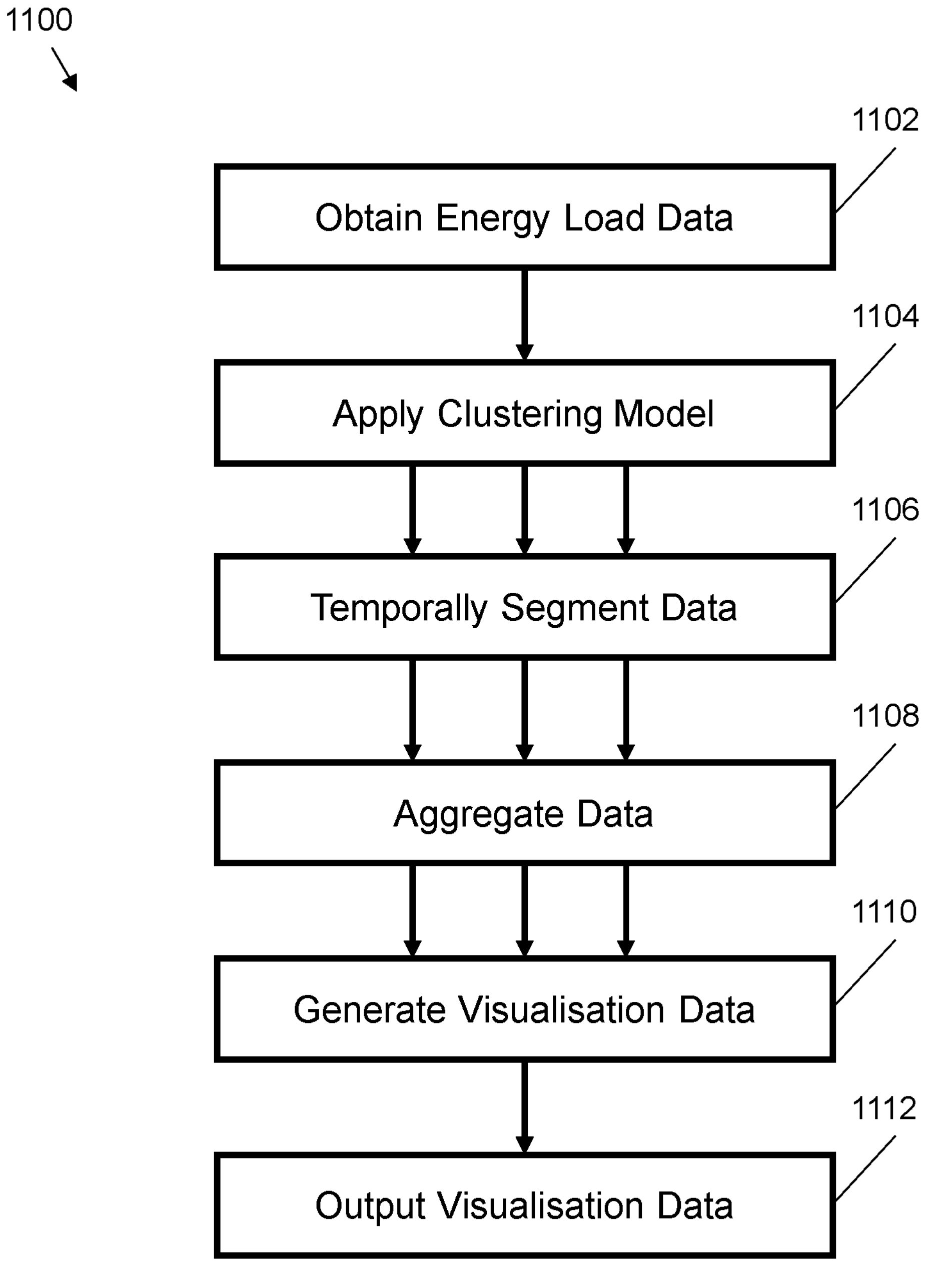
FIG. 11 is a flow diagram showing an example method for determining energy consumption patterns for a building.

FIG. 11 shows an example of a method 1100 for determining energy consumption patterns for a building. The building may comprise a non-residential building. This method 1100 may be performed to implement functions similar to the example systems described above. At block 1102, energy load data originating from energy use sensors for the building is obtained. As described previously, energy load data may be obtained regularly, e.g. on a push and/or pull basis, or in batches, and may be received from one or more of local and remote energy load measurement devices. The energy load data may comprise time-series energy consumption measurements for the building and may be based on periodic electrical power measurements or fuel flow measurements. At block 1104, a clustering model is applied to the energy load data to determine one or more partitions within the energy load data. A plurality of partitions may be located, or the clustering model may determine that only a single partition exists. The clustering model may comprise a k-nearest neighbour model or a probabilistic mixture model. In a preferred example, the clustering model comprise a Gaussian mixture model. Bayesian methods may be applied to iterative expectation-maximisation functions to optimise prior probability distributions. The output of block 1104 is one or more partitions for the energy load data received at block 1102. In the subsequent block, processing is performed on a partition basis, e.g. each partition is processed separately as represented by the parallel lines that exit block 1104 in FIG. 11. Although the lines are shown in parallel, the subsequent processes may be applied in parallel or in series, or in a combination of parallel and series processes (e.g., as per known distributed computing frameworks). At block 1106, the energy load data for each partition within the partitions is temporally segmented over a set of predefined time periods. Block 1106 may be applied to two partitions, such as the partitions 510 and 520 shown in FIG. 5. At block 1108, the temporally segmented energy load data for each partition is aggregated. This may comprise grouping the data by defined time periods, such as named days of the week, weeks, or months. At block 1110, visualisation data is generated for each partition from the aggregated energy load data. For example, the visualisation data may comprise data that allows for charts such as those shown in any one of FIG. 1, 5, 6A, 6B, 7, 9A or 9B to be displayed on a local or remote display device. At block 1112, the visualisation data for each partition is output for display. This may comprise sending the visualisation data to a coupled smart meter display device for display, and/or making the visualisation data available to Internet requests from one or more client computing devices (e.g., via a web server).

The method 1100, in a similar manner to the previously described systems, allows patterns of energy consumption to become apparent from transformed raw energy load data. Visualisation data, such as that which may be used to generate the visualisations of the Figures, then allows building controllers to identify energy inefficiencies with an aim of reducing the energy consumption for a building. For example, high loading can be identified that typically is not apparent in the raw energy load data. Moreover, patterns over different time periods, e.g. different days, weeks or months, may be accurately identified; these patterns may then be masked in comparative averaging of the raw energy load data.

In certain examples, the method 1100 may further comprise processing the aggregated energy load data for the determined partitions to estimate periods of occupancy for the building within the set of predefined time periods. These periods of occupancy may be indicated within the visualisation data. In certain examples, the visualisation data may be displayed to a user and the user may input validation data that is then received to indicate confirmation or correction of the estimated periods of occupancy. The validation data and the estimated periods of occupancy may then be used to determine occupancy data for use in generating additional energy use metrics for the building based on the aggregated energy load data. For example, this is described with reference to the variation of FIG. 8.

In certain examples, the method 1100 may further comprise determining one or more energy efficiency metrics using the aggregated energy load data, repeating the method for one or more additional buildings so as to generate a set of energy efficiency metrics for a plurality of buildings, and processing the set of energy efficiency metrics for the plurality of buildings to determine a relative measure of energy efficiency for the building as compared to the plurality of buildings. This relative measure of energy efficiency for the building may be included in the outputted visualisation data for display. For example, the relative measure of energy efficiency may comprise one or more of the energy efficiency metrics shown in FIG. 10.

In certain examples, the method 1100 may further comprise: determining a set of control actions available within the building; predicting a change in the aggregated energy load data for one or more of the partitions for one or more of the set of control actions; and outputting recommendations for control actions that are predicted to reduce the aggregated energy load. For example, the control actions may comprise switching off or changing operating parameters for appliances and/or equipment within the building. Changes may be predicted using machine learning models (e.g., deep neural networks) and/or based on historic data. In certain cases, the energy data processor 410 or 810 may be configured to receive simulated energy load data from a simulated building and to output energy efficiency metrics for the simulated building, where the simulated building comprises the current building with the one or more of the control actions enacted. The recommended changes may be presented to a user via the user interface 864 and the method may further comprise receiving a selection of one or more control actions within the recommendations for control actions, and implementing the selected one or more control actions within the building, e.g. via the building services unit 310.

In certain examples, a non-transitory computer-readable storage medium may be provided storing instructions that, when executed by a processor, cause the processor to perform a series of operations. For example, the energy data processor described above may form part of a computing device and/or may be coupled to one or more memory devices in a similar manner to the measurement processor 230. In one case, the processor and storage medium may form part of a system as described in any one of the previous examples. The storage medium may comprise an EPROM such as 234 or other firmware storage device. The instructions may comprise instructions to implement the method 1100 of FIG. 11 and any of the variations described above.

The above examples are to be understood as illustrative of the invention. Further examples are envisaged. The various "engines" described herein may be implemented using computer program code that is processed by a hardware processor. Computer program code may be written in one or more programming languages, including, but not limited to, C, C++, C#, Python, Java, Fortran, Perl, R, Ruby and Javascript. It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the invention, which is defined in the accompanying claims.

The invention claimed is:

1. A system for the determination of energy consumption patterns for a building, the system comprising:

a processor;

a memory storing instructions that when implemented by the processor implement:

an energy load data interface to receive energy load data originating from energy use sensors for the building, wherein the energy load data comprises time-series energy consumption measurements for the building;

a data partition engine to apply a clustering model to the energy load data to determine a plurality of partitions within the energy load data, wherein the data partition engine is configured to apply a probabilistic mixture model to the energy load data and wherein each of the plurality of partitions comprises a continuous group of data samples over time within the energy load data;

a temporal processing engine to segment and aggregate the energy load data over a set of predefined time periods, wherein the temporal processing engine is independently applied to partitions determined by the data partition engine;

a visualisation engine to generate visualisation data from the output of the temporal processing engine, the visualisation data comprising respective sets of data for partitions determined by the data partition engine; and an output interface to output the visualisation data for display the memory further storing instructions that when implemented by the processor implement:

determining a set of control actions available within the building;

predicting a change in the aggregated energy load data for at least one of the one or more partitions for at least one of the set of control actions; and outputting recommendations for control actions that are predicted to reduce the aggregated energy load.

2. The system according to claim 1, wherein the probabilistic mixture model comprises a Gaussian mixture model.

3. The system according to claim 2, wherein the data partition engine applies Bayesian inference to infer probabilistic distributions for the parameters of the Gaussian mixture model.

4. The system according to claim 1, further comprising:

an occupancy engine to estimate periods of occupancy for the building using the output of the temporal processing engine, wherein the visualisation data is generated using the periods of occupancy.

5. The system according to claim 4, wherein the visualisation data comprises an indication of estimated periods of occupancy as output by the occupancy engine, and wherein the system further comprises:

a user interface to receive validation data for the estimated periods of occupancy from a user, wherein the visualisation engine is configured to generate visualisation data from the output of the temporal processing engine and data indicating a confirmed set of periods of occupancy that is determined from the validation data and the estimated periods of occupancy output by the occupancy engine.

6. The system according to claim 1, wherein the visualisation engine comprises:

a benchmarking engine to output at least one energy efficiency metric for the building, the benchmarking engine being configured to determine the at least one energy efficiency metric using an output of the temporal processing engine as applied to a plurality of buildings, wherein the at least one energy efficiency metric forms part of the visualisation data.

7. The system according to claim 6, wherein the at least one energy efficiency metric comprises an energy efficiency score for the building within a predefined range, the predefined range indicating a range of energy efficiency scores for the plurality of buildings and a daily mean load factor representing energy consumption over a daily time period, wherein the temporal processing engine is configured to segment the energy load data over one or more named days within a week and to determine the energy consumption as an aggregate measure for each of the one or more named days.

8. The system according to claim 6, wherein the at least one energy efficiency metric comprises one or more of:

a base load factor representing a base-level energy consumption; and a peak load factor representing a maximum energy consumption.

9. A method for determining energy consumption patterns for a building, the method comprising:

obtaining energy load data originating from energy use sensors for the building, wherein the energy load data comprises time-series energy consumption measurements for the building;

applying a clustering model to the energy load data to determine one or more partitions within the energy load data, wherein the clustering model is a probabilistic mixture model and wherein each of the plurality of partitions comprises a continuous group of data samples over time within the energy load data;

temporally segmenting the energy load data on a partition basis over a set of predefined time periods;

aggregating the temporally segmented energy load data on a partition basis;

generating visualisation data for the aggregated energy load data on a partition basis; and outputting the visualisation data for the one or more partitions for display the method further comprising:

determining a set of control actions available within the building;

predicting a change in the aggregated energy load data for at least one of the one or more partitions for at least one of the set of control actions; and outputting recommendations for control actions that are predicted to reduce the aggregated energy load.

10. The method according to claim 9, wherein the probabilistic mixture model comprises a Gaussian mixture model.

11. The method according to claim 10, wherein applying the clustering model comprises:

applying Bayesian inference to infer probabilistic distributions for the parameters of the Gaussian mixture model.

12. The method according to claim 9, comprising:

processing the aggregated energy load data for the one or more partitions to estimate periods of occupancy for the building within the set of predefined time periods;

indicating the estimated periods of occupancy within the visualisation data;

displaying the visualisation data to a user;

receiving validation data from the user indicating confirmation or correction of the estimated periods of occupancy; and using the validation data and the estimated periods of occupancy to determine occupancy data for use in generating additional energy use metrics for the building based on the aggregated energy load data for the first and second partitions.

13. The method according to claim 9, comprising:

determining one or more energy efficiency metrics using the aggregated energy load data for the one or more partitions;

repeating the method for one or more additional buildings so as to generate a set of energy efficiency metrics for a plurality of buildings;

processing the set of energy efficiency metrics for the plurality of buildings to determine a measure of energy efficiency for the building as compared to the plurality of buildings, wherein the measure of energy efficiency for the building is included in the outputted visualisation data for display.

14. The method according to claim 13, wherein the set of predefined time periods comprise named days within a week and the measure of energy efficiency comprises:

a daily mean load factor representing energy consumption over a daily time period and wherein the measure of energy efficiency comprises one or more of:

a base load factor representing a base-level energy consumption; and a peak load factor representing a maximum energy consumption, the method further comprising:

displaying the measure of energy efficiency as an indicated point within a predefined range, the predefined range indicating a range of energy efficiency measures for the plurality of buildings.

15. A non-transitory computer-readable storage medium storing instructions that, when executed by a processor, cause the processor to perform the method of claim 9.

* * * * *